Patented Oct. 23, 1934

1,977,803

UNITED STATES PATENT OFFICE 1,977,803

ALLERGEN SOLUTION

Marjorie B. Moore, Waukegan, Ill., assignor to Abbott Laboratories, North Chicago, Ill., a corporation of Illinois No Drawing. Application April 11, 1932
Serial No. 604,653

4 Claims. (Cl. 167—78)

My invention relates to allergen solutions and more particularly contemplates producing solutions of allergens or dilutions of allergen extracts which will be non-irritating and whose potency will be retained for as long a time as is the case with the painful glycerosaline extracts and for a longer time than the aqueous extracts commonly used at present.

By "allergens", I mean any substance to which certain individuals may become hypersensitive, so that a dose which would be entirely innocuous for an ordinary individual may give rise to any of a variety of symptom complexes which are characterized as "allergic diseases". Examples of such "allergic diseases" are hay fever, asthma, urticaria, angioneurotic edema, migraine, eczema and colitis. Some of these syndromes may have other causes than hypersensitiveness, but hypersensitiveness to some usually harmless substance has been shown to be the cause in at least a part of such cases.

Extracts of the offending allergens have been found to be of value in the diagnosis and treatment of various allergic diseases. However, such extracts deteriorate to a greater or less extent, depending upon the menstruum used and upon the original concentration of the extract. Extracts containing a large percentage of glycerol are relatively stable, but have the disadvantage of being so irritating to the tissues as to render them unsuitable for intradermal use.

I have discovered that an aqueous sugar solution is quite effective in preserving the potency of allergen solutions in concentrations of the allergen varying within wide limits. I preferably use an extract which is practically isotonic with the body fluids, and hence is not irritating when injected either subcutaneously or intracutaneously. However, I may use any concentration of sugar over about 1 per cent. Various sugars may be used for my purpose. In order to prevent the possibility of bacterial contamination of the extracts, I prefer to add a small percentage of a bacteriostatic agent to the solution.

*Examle 1.*—An extract of giant ragweed pollen representing 1 gm. dry pollen per 5000 cc. of distilled water, was found to remain potent after four months' incubation and five months at room temperature, when preserved in a menstruum containing 5% dextrose and 0.1% cresol.

*Example 2.*—An extract was prepared from equal weights of short and giant ragweed pollen representing 3 gm. dry pollen per 100 cc. of menstruum containing 5% dextrose and 0.1% cresol, and dilutions were made of this extract in the same menstruum representing 1:000, 1:1000, 1:10,000 and 1:100,000 parts of dry pollen. After more than three months' incubation even the dilute solutions were found to be potent, and the extract was found to have retained at least as great potency as a glycerosaline extract similarly treated.

*Example 3.*—An extract of orris root powder representing 1 gm. dry material in 10 cc. menstruum containing 5% dextrose and 0.1% cresol was prepared and found to be quite stable when kept at room temperature for three months.

*Example 4.*—Allergen extracts have also been prepared using as preservatives other sugars, such as lactose (reducing sugar) and sucrose (non-reducing sugar) as well as dextrose with such bacteriostatic agents as phenol, metaphen and chlorbutanol.

The solutions of the preservative compounds have preferably been used in such a concentration as to be practically isotonic with the body fluids in order to avoid irritation on injection, but these limiting concentrations are not necessary for preservation of potency of the allergens, as any concentration above 1% is effective for the latter purpose.

Various modifications and variations coming within the spirit of my invention will doubtless suggest themselves to those skilled in the art, and hence I do not wish to be limited to the specific embodiments disclosed herein, except to the extent indicated by the appended claims, which are to be interpreted as broadly as the state of the art will permit.

I claim as my invention:

1. A composition of the class described comprising an allergic proteinous substance in a menstruum of an approximately isotonic aqueous solution of a sugar.

2. A composition of the class described comprising an allergic proteinous substance in a menstruum of an approximately isotonic aqueous solution of dextrose.

3. A composition of the class described comprising an extract of pollen in a menstruum of an approximately isotonic aqueous solution of dextrose.

4. A composition of the class described comprising an extract of pollen in a menstruum of an approximately isotonic aqueous solution of dextrose, together with a bacteriostatic agent dissolved therein.

MARJORIE B. MOORE.